United States Patent Office 3,640,912
Patented Feb. 8, 1972

3,640,912
MOLDING MATERIALS BASED ON ELASTOMERIC POLYMERS AND ORGANIC BINDERS WITH OR WITHOUT MINERAL FILLERS
Hans Reinhard, Limburgerhof, Rolf Petri, Frankenthal, and Wilhelm-Friedrich Beckerle, Worms, Germany, assignors to Badische Anilin- & Soda-Fabrik Aktiengesellschaft, Ludwigshafen (Rhine), Germany
No Drawing. Filed Mar. 12, 1969, Ser. No. 806,677
Claims priority, application Germany, Mar. 16, 1968, P 17 20 063.4
Int. Cl. C08d 9/04, 13/38
U.S. Cl. 260—2.3
14 Claims

ABSTRACT OF THE DISCLOSURE

Molding materials based on 20 to 90% of elastomeric polymers, 5 to 30% of binder copolymers prepared from 20 to 80% of butadiene, 80 to 20% of styrene and/or acrylonitrile and 0 to 20% of other monomers and finely dispersed in water, 5 to 200% (with reference to the binder copolymers) of cement and/or slaked lime, 0.5 to 10% of air-drying oil and 0 to 50% of mineral fillers are particularly suitable for the production of playground and sportsground surfacings which are easy to look after.

---

Molding materials based on elastomeric polymers, such as natural and synthetic rubbers and organic binders, such as bitumen, have long been known.

It has also been recommended to use such molding materials, which may contain mineral fillers, such as sand, chippings and/or stone dust, in the production of road surfacings.

The production of surfacings from molding materials based on organic fillers, such as rubbers and cork and/or inorganic fillers, such as sand, chippings and/or brick dust, which contain as binder bitumen or bituminous emulsions is also known. Surfacings made from such molding materials, however, become very soft on exposure to sunlight and hard in the cold. Furthermore, in the course of time such surfacings undergo a loss of volatile constituents of the bitumen due to evaporation and they become increasingly brittle.

It has now been found that molding materials based on (a) 20 to 90% by weight of elastomeric polymers, (b) 5 to 30% by weight of binder polymers, (c) 5 to 200% by weight, with reference to the binder polymer (b), of cement and/or slaked lime and (d) 0 to 50% by weight of mineral fillers have excellent properties when they contain as binder polymers (b) copolymers derived from 20 to 80% by weight of butadiene, 80 to 20% by weight of styrene and/or acrylonitrile and/or 0 to 20% by weight of other olefinically unsaturated monomers in the form of an aqueous dispersion and in addition (e) 0.5 to 10% by weight of air-drying oils. The amount of binder polymers in the molding materials is preferably from 10 to 20% by weight, with reference to the weight of the molding material.

The binder polymers (b) preferably contain from 40 to 60% by weight of butadiene units. Styrene is preferred as comonomer. In addition to these main monomers the binder polymers can also contain up to 20% by weight of units of other olefinically unsaturated monomers, in particular acrylates and methacrylates, e.g. alkanols with 1 to 8 C atoms. Moreover, other suitable olefinically unsaturated comonomers are vinyl esters, such as vinyl acetate and vinyl propionate, as well as up to 10% by weight, preferably from 2 to 7% by weight, with reference to the butadiene polymers, of $\alpha,\beta$-olefinically unsaturated mono- and dicarboxylic acids with 3 to 5 C atoms, such as acrylic acid, methacrylic, maleic acid and itaconic acid, amides of such carboxylic acids, in particular acrylamide and methacrylamide, and N-alkylol compounds of such amides and ethers thereof, in particular N-methylol methacrylamide, N-methylol acrylamide, N-methoxymethyl acrylamide and methacrylamide, and N-butoxymethyl acrylamide and methacrylamide. Of the acrylates and methacrylates suitable as comonomers n-butyl acrylate, ethyl acrylate, n-hexyl acrylate, 2-ethylhexal acrylate and methyl methacrylate are of particular interest.

The butadiene copolymers employed as binders for the molding materials are used in the form of their aqueous dispersions. These can be easily prepared in a conventional manner and generally contain from 30 to 60% by weight of butadiene copolymers and, as emulsifying agents, the usual amounts of substances with an emulsifying action, e.g. alkoxylation products, which may be sulfonated. Particularly suitable alkoxylation products for the aqueous dispersions of the polymers used as binders are those having at least 5 alkylene oxide units, and in particular those containing at least 5 ethylene oxide units. The number of alkylene oxide units of such alkoxylation products is in general between 10 and 50, and preferably between 15 and 30. The alkoxylation products can be derived from alkyl phenols, such as p-nonylphenol and 2-ethylhexyl phenol, from fatty acid amides, such as stearic acid amide or sperm oil fatty acid amide, from fatty acids, such as stearic acid and oleic acid, or from fatty alcohols, such as stearyl alcohol and lauryl alcohol. The dispersions of the butadiene copolymers can also contain other conventional emulsifying agents in addition to or in place of such alkoxylation products.

The elastomeric polymers used as component (a) generally possess elastomeric properties in the temperature range from $-20$ to $+80°$ C. Very suitable materials are natural and synthetic rubbers as well as butyl rubber which are preferably vulcanized in a conventional manner and are stabilized in particular against the action of ultraviolet light. For example tyre rubber waste is particularly suitable. Other suitable elastomeric polymers for molding materials are for example polyurethane rubber and polyisobutylene. The elastomeric polymers are added to the molding materials during their manufacture generally in comminuted form, the particles generally having a diameter of less than 10 mm., usually between 2 and 5 mm. When the elastomeric polymers are added in the form of fibers, the length of the fibers is preferably from 5 to 20 mm. The elastomeric polymers can also be incorporated into the molding materials in the expanded state. The amount of these substances in the molding materials is preferably from 40 to 70% by weight with reference to the weight of the molding material.

The molding materials contain, as component (c), conventional cements, for example portland cement, Eisenportlandzement (at least 70% clinker, balance slag), high-alumina cement, Hochofenzement (69–15% clinker, balance slag), sulfate-resistant cement, trass cement or slaked lime. In the production of the molding materials quicklime may also be used instead of slaked lime or in addition to it.

The new molding materials may also contain, as component (d), up to 50% by weight of mineral fillers, such as stone dust, brick dust, slate dust, heavy spar, slag powder and/or chippings. Suitable chippings preferably have a fine particle size and in general a maximum particle diameter of less than 7 mm.

Finally, the new molding materials contain, as component (e), 0.5 to 10, in particular from 1 to 3% by weight, of an air-drying oil. Particularly suitable oils are linseed oil, tung oil, soybean oil, emulsified butadiene oils and castor oil.

In the production of the molding materials, the components are mixed by using conventional forced circulation mixers, such as screw mixers or rotary-type mixers, such as are used in the building industry. Water may also be added. The amount of water (including any water introduced by the aqueous dispersion of the butadiene copolymer) is generally between 3 and 30% by weight with reference to the freshly mixed molding material. The freshly mixed molding material, while still capable of plastic deformation, can be applied in a conventional manner with the aid of machines normally used in the building industry, e.g. road finishers, to substrates, e.g. subgrades for sportsgrounds or roads. Molding materials can also be introduced into molds and hardened therein by the setting of the cement and/or slaked lime. They are particularly suitable for the production of playground and sportsground pavements and are generally applied in a thickness of from 0.5 to 5 cm. to subgrades prepared in a conventional manner. It is also possible to use the molding material while it is still capable of plastic deformation, if desired in the form of slabs or strips, for the production of surfacings for footpaths.

By appropriate choice of the relative proportions of the components of the molding material it is possible to vary the hardness and elasticity within wide limits. For example relatively hard compositions suitable for the production of surfaces for footpaths can be obtained by incorporating a relatively high proportion of mineral fillers, for example from 30 to 50% by weight, and using highly vulcanized elastic polymers, e.g. hard rubber waste.

Very soft surfaces, for example for children's playgrounds, are obtained on the other hand by using only a small amount of particulate mineral filler, for example from 10 to 30% by weight, with reference to the total molding material, of brick dust or stone dust and relatively weakly vulcanized natural rubber, synthetic rubber or butyl rubber scrap.

In the production of surfaces for football groups molding materials have proved to be particularly suitable which contain from 5 to 30% by weight of emulsified butadiene copolymers, from 20 to 80% by weight of rubber scrap having a Shore hardness of 45 to 90.5, up to 200% by weight, with reference to the butadiene copolymer, of cement, from 10 to 50% by weight of a mixture of particulate stone chippings with a particle size of from 1 to 7 mm. and 1 to 3% by weight of tung oil and/or linseed oil.

Suitable surfaces for tennis courts can be made for example from molding materials comprising 9 to 11% by weight, with reference to the molding material, of a 40 to 60% (with reference to the dispersion) aqueous dispersion of a copolymer derived from 60 to 80% by weight of butadiene, 5 to 15% by weight of n-butyl acrylate and 20 to 30% by weight of styrene, as well as 20 to 30% by weight, with reference to the molding material, of rubber fibers with a Shore hardness A of 50 to 60 and a length of 5 to 15 mm., 40 to 50% by weight, with reference to the molding material, of moraine chippings with a particle size of from 2 to 5 mm., 7 to 11% by weight, with reference to the molding material, of Eisenportlandzement and 1 to 4% by weight, with reference to the molding material, of tung oil.

Molding materials comprising 10 to 14% by weight of a 40 to 60% (with reference to the dispersion) aqueous dispersion of a copolymer derived from 60 to 80%, with reference to the copolymers, of butadiene and 20 to 40% by weight, with reference to the copolymers, of styrene as well as 12 to 16% by weight of rubber fibers having a Shore hardness A of 60 to 80 and a length of 20 to 30 mm., 12 to 16% by weight of rubber fibers having a length of 1 to 10 mm. and a Shore hardness A of 60 to 80, 2 to 11% by weight of Eisenportlandzement 375 and 1 to 4% by weight of tung oil are particularly suitable for the production of runways.

Pigments can also be added to the molding materials, for example titanium dioxide, zinc white, red lead, iron oxide red, chromium oxide green or carbon black. Such colored molding materials are suitable for example in conjunction with colorless molding materials, for the production of boundary lines on playgrounds and sportsgrounds, for the production of colored slabs and also for the production of marking strips on pedestrian crossings.

A particular advantage of the new molding materials is that they can be applied cold to the subgrade in the production of sportsground and playground surfacings. Embrittlement due to the evaporation of low boiling constituents no longer occurs after the setting and drying out of the surfacings, which takes only a few hours. Furthermore, the surfaces prepared from the molding materials need practically no looking after, they are less liable to cause injury than conventional surfacings, put less strain on joints, muscles and tendons, do not dust and then good properties hardly change under the temperature fluctuations which occur in practice.

Depending on the composition of the mineral fillers and the particle size distribution of the mineral fillers used, water-permeable of water-impermeable surfaces can be prepared from the molding materials.

The parts and percentages given in the following examples are by weight.

EXAMPLE 1

10 parts of a 50% aqueous dispersion, prepared in a conventional manner, of a copolymer derived from 50% of butadiene, 45% of styrene and 5% of acrylonitrile and containing as emulsifying agent 3.0% of a nonylphenol oxyethylated with 25 moles of ethylene oxide and subsequently sulfonated, is mixed in a forced circulation mixer with 35 parts of moraine chippings having a particle size of from 1 to 7 mm., 25 parts of rubber fibers with a fiber length of from 1 to 20 mm. (Shore hardness A 70), 7 parts of Eisenportlandzement 275 and 1.5 parts of tung oil. A molding material is obtained which is particularly suitable for the manufacture of surfacings for tennis courts and multipurpose playing fields. The surfaces have good water permeability and resilience, the latter providing favorable conditions for walking, running and jumping and giving a good bouncing height for balls.

EXAMPLE 2

20 parts of a 50% aqueous dispersion, prepared in a conventional manner, of a copolymer derived from 40% of butadiene, 10% of n-butyl acrylate and 50% of styrene and containing as emulsifying agent 1.5% of an adduct of 30 moles of ethylene oxide and 1 mole of isooctylphenol is mixed in a forced circulation mixer with 10 parts of rubber powder, 20 parts of rubber fibers having a fiber length of from 1 to 20 mm., 15 parts of rubber granules having a particle diameter of from 2 to 5 mm., 18 parts of Eisenportlandzement 275 and 3 parts of linseed oil. The rubber used has a Shore hardness A of 55. A molding material is obtained which can be processed without difficulty for several hours and which is particularly suitable for the production of surfacings for footpaths and running tracks.

EXAMPLE 3

15 parts of a 50% (with reference to the dispersion) of an aqueous dispersion, prepared in a conventional manner, of a copolymer derived from 60% of butadiene, 33% of styrene and 7% of 2-ethylhexyl acrylate, and containing as emulsifying agent 2% of 2-ethylhexyl phenol which is oxyethylated with 20 moles of ethylene oxide and sulfonated, is mixed in a forced circulation mixer with 20 parts of brick dust with a particle diameter of up to 3 mm., 55 parts rubber fibers with a length of from 1 to 20 mm. (Shore hardness A 40), 10 parts of portland cement 275 and 3 parts of linseed oil. A molding material is obtained which is particularly suitable for producing surfacings for playgrounds and sportsgrounds. The surfaces are impermeable to water, need no looking after and substantially prevent injuries brought about by falls.

EXAMPLE 4

56 parts of a 50% aqueous dispersion, prepared in a conventional manner, of a copolymer derived from 22% of butadiene, 49% of styrene, 9% of acrylonitrile and 20% of n-butyl acrylate, and containing as emulsifying agent 1.5% of n-octylphenol oxyethylated with 20 moles of ethylene oxide, is mixed with 50 parts of rubber fibers (5 to 15 mm. in length, Shore hardness A 45), 5 parts of polyisobutylene chips (average molecular weight 5,000,000), 14.7 parts of slaked lime and 0.8 part of tung oil. A molding material is obtained which is particularly suitable for the production of running tracks and runways. It is possible to run on the tracks with spikes and the surfaces need hardly any looking after.

EXAMPLE 5

20 parts of a 50% aqueous dispersion, prepared in a conventional manner, of a copolymer derived from 70% of butadiene, 23% of styrene and 7% of 2-ethylhexyl acrylate, and containing as emulsifying agent 2% of 2-ethylhexyl phenol which is oxyethylated with 35 moles of ethylene oxide and sulfonated, is mixed with 30 parts of rubber powder (particle diameter up to 3 mm., Shore hardness A 70), 40 parts of rubber fibers (Shore hardness A 50), 10 parts of portland cement 275 and 10 parts of butadiene oil. A molding material is obtained which is suitable chiefly for footpaths and running tracks. The surfaces are impermeable to water, need no looking after and substantially prevent injuries brought about by falls.

EXAMPLE 6

36 parts of a 50% aqueous dispersion, prepared in a conventional manner, of a copolymer derived from 40% of butadiene, 51.2% of styrene and 8.7% of acrylonitrile, and containing as emulsifying agent 2.5% of iso-nonylphenol which is oxyethylated with 25 moles of ethylene oxide and subsequently sulfonated, is mixed with 29.5 parts of basalt chips (particle size 2 to 5 mm.), 20 parts of polyurethane rubber powder (particle diameter up to 1 mm., Shore hardness A 30), 10 parts of rubber cubes (edge length 3 mm., Shore hardness A 60), 0.5 part of soyabean oil, 5 parts of slaked lime and 5 parts of portland cement PZ 275. Water-permeable surfacings which are chiefly suitable for multipurpose playing fields are obtained.

EXAMPLE 7

56 parts of a 50% aqueous dispersion, prepared in a conventional manner, of a copolymer derived from 25% of butadiene and 75% of styrene, and containing as emulsifying agent 1% of n-octylphenol which is oxyethylated with 40 moles of ethylene oxide and subsequently sulfonated, is mixed with 50 parts of moraine chipping (particle size 3 to 5 mm.), 10 parts of butyl rubber (Shore hardness A 40), 8 parts of portland cement PZ 375, 1 part of soybean oil, 1 part of tung oil and 1 part of linseed oil. A molding material is obtained which is particularly suitable for making tennis court surfacings. The surfaces are permeable to water.

EXAMPLE 8

30 parts of a 50% aqueous dispersion, prepared in a conventional manner, of a copolymer derived from 40% of butadiene, 40% of acrylonitrile, 15% of ethyl acrylate and 5% of acrylic acid is mixed with 60 parts of moraine chippings (particle size 2 to 8 mm.), 10 parts of rubber fibers (Shore hardness A 65, fiber length 5 to 20 mm.), 13 parts of Eisenportlandzement and 2 parts linseed oil. A molding material is obtained which is suitable for surfacings for multipurpose playing fields, tennis courts and footpaths. The surfaces are permeable to water and need no looking after.

EXAMPLE 9

30 parts of a 50% aqueous dispersion, prepared in a conventional manner, of a copolymer derived from 60% of butadiene, 20% of acrylonitrile, 18% of methyl methacrylate and 2% of N-methylol methacrylate, and containing as emulsifying agent 4% of 2-ethylhexyl phenol oxyethylated with 35 moles of ethylene oxide is mixed with 15 parts of high-alumina cement, 30 parts of rubber fiber (fiber length 2 to 5 mm., Shore hardness A 35), 15 parts of rubber fibers (fiber length 5 to 20 mm., Shore hardness A 50), 10 parts of rubber powder (particle diameter up to 3 mm., Shore hardness A 50), 7 parts of sand (particle diameter up to 3 mm.), 3 parts of iron oxide red and 2 parts of tung oil. A molding material is obtained which is suitable for making surfaces for playgrounds for children, running tracks, runways and grounds for physical training. The surfaces are soft, resilient, need no looking after and are impermeable to water.

We claim:
1. A molding material based on (a) 20 to 90% by weight of one or more elastomeric polymers selected from the group consisting of natural and synthetic rubber in the form of particles or fibers, (b) 5 to 30% by weight of a binder polymer derived from 20 to 80% by weight of butadiene, 80 to 20% by weight of monomers selected from the group consisting of styrene and acrylonitrile, and 0 to 20% by weight of another olefinically unsaturated monomer in the form of an aqueous dispersion, (c) 5 to 200%, with reference to the binder polymer (b), of cement, (d) 0 to 50% by weight of a mineral filler, and (e) 0.5 to 10% by weight of an air-drying oil.

2. A molding material as in claim 1 in which the binder contains as comonomer a monomer selected from the group consisting of acrylates and methacrylates.

3. A molding material as in claim 1 in which the amount of binder polymer in the molding material is from 10 to 20% by weight with reference to the weight of the molding material.

4. A molding material as in claim 1, in which the binder polymer contains from 40 to 60% by weight of butadiene units.

5. A molding material as in claim 1 in which the amount of butadiene in the binder polymer (b) is from 30 to 60% by weight.

6. A molding material as in claim 5 in which the butadiene is emulsified in aqueous solution with an alkoxylation product having at least five alkylene oxide units.

7. A molding material as in claim 1 in which the natural or synthetic rubber is in the form of tyre rubber waste.

8. A molding material as in claim 1 in which component (a) is employed in the form of particles having a diameter of less than 10 mm.

9. A molding material as in claim 8 in which most of the particles have a diameter of from 2 to 5 mm.

10. A molding material as in claim 1 in which component (a) is used in the form of fibers having a length of from 5 to 20 mm.

11. A molding material as in claim 1 in which component (a) is present in an amount of from 40 to 70% by weight of the molding material.

12. A molding material as in claim 1 in which component (d) is brick or stone dust.

13. A molding material as in claim 1 in which component (e) is present in an amount of from 1 to 3% by weight with reference to the weight of the molding material.

14. A surface made from a molding material as in claim 1.

References Cited

UNITED STATES PATENTS

| | | | |
|---|---|---|---|
| 1,940,528 | 12/1933 | Bond | 260—29.7 |
| 3,043,790 | 7/1962 | Sanders | 260—29.7 |
| 3,425,975 | 2/1969 | Barrett | 260—23.7 |

FOREIGN PATENTS

| | | | |
|---|---|---|---|
| 480,793 | 3/1938 | Great Britain | 260—29.7 |
| 978,234 | 12/1964 | Great Britain | 260—2.3 |

SAMUEL H. BLECH, Primary Examiner

U.S. Cl. X.R.

94—21; 260—5, 23.7 A, 29.7 S, 41.5 A